Oct. 30, 1951 L. J. F. ELL 2,572,917
SCREW ATTACHMENT FOR SAUSAGE STUFFERS
Filed Feb. 7, 1948
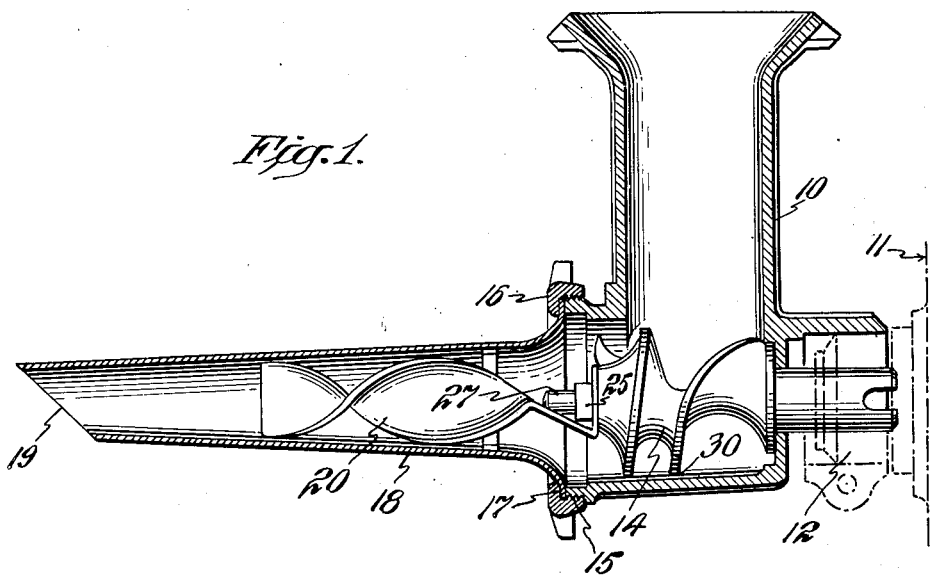
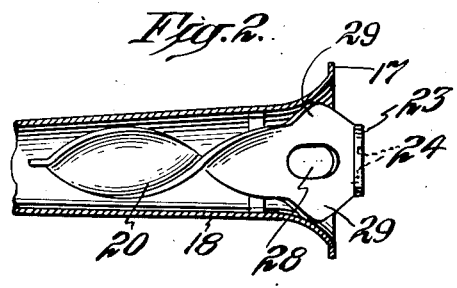
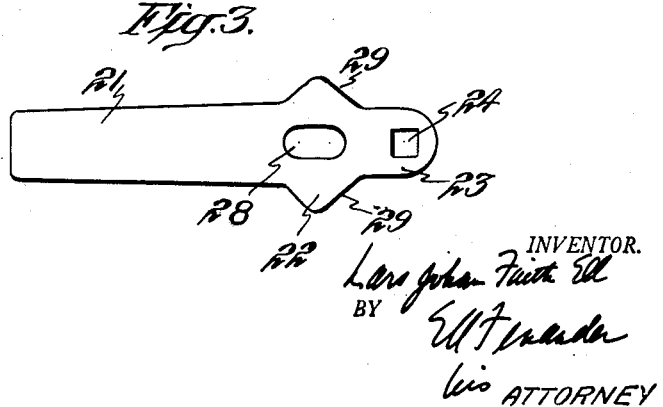

Patented Oct. 30, 1951

2,572,917

UNITED STATES PATENT OFFICE 2,572,917

SCREW ATTACHMENT FOR SAUSAGE STUFFERS

Lars Johan Faith Ell, Stockholm, Sweden, assignor to Aktiebolaget Elektrolux, Stockholm, Sweden, a corporation of Sweden Application February 7, 1948, Serial No. 6,883
In Sweden June 10, 1941

Section 1, Public Law 690, August 8, 1946
Patent expires June 10, 1961

4 Claims. (Cl. 17—40)

The present invention relates to an apparatus for filling or stuffing sausage casings or similar tubular flexible enclosures, and one of the objects of the invention is to provide a device which is attachable to a meat grinder or similar mincing or grinding apparatus and from which the ground material will be fed directly with a uniform feed into the sausage casing.

More particularly, the invention contemplates the provision of a tapering or funnel-shaped delivery tube over which the sausage casing is fitted and from which the ground or minced material is delivered into the casing. The invention further includes the provision of a spiral feeding screw located within and extending for a substantial portion of the length of the tapering feed tube, which screw is provided with means whereby it is coupled in a simple but effective manner to the spiral feeding screw or worm contained within the body of the grinder. An arrangement as above described prevents undue compacting and possible clogging of the ground material in the feed tube and insures uniformity of delivery of the material into the casing, eliminating looseness and the formation of air spaces within the resultant sausage.

These and other objects to be hereinafter disclosed, are attained by the invention hereinafter set forth and more particularly pointed out in the claims appended hereto.

In the accompanying drawing, wherein an illustrative embodiment of the invention is disclosed:

Fig. 1 is a vertical sectional view, showing the improved construction;

Fig. 2 is a sectional view of a portion of the delivery tube, the section being taken at right angles to that of Fig. 1, and Fig. 3 shows a sheet metal strip, constituting a blank from which the auxiliary feeding spiral or screw is produced.

In Fig. 1 of the drawing, 10 indicates the housing portion of a meat grinder intended to be fitted to a suitable electrically-operated machine of a type employed in the household for mixing and various other purposes. Such a machine, a part of which is generally indicated at 11, is provided with a collar 12 which encloses the driving shaft of the machine. Arranged within the housing 10 of the grinder is a spiral feed worm 14 which, when the grinder is fitted on the machine, is arranged to couple with the drive shaft and be rotated thereby.

The front or outlet end of the grinder housing 10 is threaded as indicated at 15 for the reception of a gland nut or ring 16 which clamps between it and the outlet end of the grinder housing, a flared end portion 17 of a tapering or funnel-shaped material-delivery tube 18. Through this arrangement it will be apparent that when the delivery tube 18 is affixed to the outlet end of the housing 10 as above described, said tube 18 will constitute a rigid extension of the outlet 18 and over which the open end of the sausage casing may be slipped to directly receive the minced or ground meat directly from the tapered open end 19 of the delivery tube 18.

Located within the delivery tube 18 and extending through the same for a substantial portion of the length of said tube, and preferably, but not necessarily, for at least more than one-half of the length of the tube 18, is an auxiliary feed screw or spiral member 20. According to the present embodiment of the invention, the auxiliary feed screw 20 can be formed from a spirally twisted, elongated strip 21 of relatively thin sheet metal, said strip in blank form and before being twisted into spiral shape being clearly disclosed in Fig. 3.

Near one of its ends, the strip 21 is formed with a widened head portion 22 from which extends a tab portion 23, the latter portion being provided with a non-round opening 24, preferably, but not necessarily, square in shape. In the formation of the auxiliary feed screw 20, the tab portion 23 of the blank or strip 21 is bent at substantially right angles to the longitudinal axis of the feed screw, and the non-round aperture 24 is then fitted over a pin 25 of corresponding shape formed on and constituting an extension of the end of the grinder feed screw 14. In order to clear the end portion 27 of the pin 25, which end portion of the pin normally fits through an opening in the usual perforated disk of the grinding machine when said disk is fitted in place during the conventional grinding operation, the widened portion 22 of the auxiliary feed screw 20 is formed with the aperture 28. The widened portion 22 of the auxiliary feed screw 20 is so shaped as to provide the two laterally extending wings 29 which, as shown in Fig. 2, are operative against the inside surface of the wider or flared end of the tapering delivery tube 18. These wing portions thus serve as bearings for the auxiliary feed screw 20 and thus also for the forward end of the grinder feed screw 14 which is coupled to the auxiliary feed screw 20 in the manner set forth.

From the foregoing, the operation of the device will be readily understood. The material-feeding means for stuffing the sausage casings, consisting of the delivery tube 18, with the auxiliary feed screw 20 arranged within the same in the manner described, is coupled to the grinder by fitting the opening 24 over the complementarily-shaped portion the pin 25, and by clamping the delivery tube 20 over the outlet end of the grinder housing by means of the gland-nut or ring 16. During the rotation of the grinder feed screw 14, the ground meet or other material will be fed thereby into the delivery tube 18 and as the auxiliary feed screw 18 is now coupled to the grinder feed screw 14 and constitutes an extension of the same and is rotated therewith, it is apparent that the material will be fed smoothly and continuously through the delivery tube 18 and into the sausage casing fitted over the outlet end 19 of the tube. When it is no longer desired to use the apparatus for sausage-stuffing purposes, the delivery tube and the auxiliary feed screw 20 are removed by unthreading of the nut 16 and the conventional perforated grinder disk may then be clamped between the outlet end of the grinder housing 10 and the nut 16 and the grinder is then ready for the resumption of its normal grinding operation.

It is to be noted that the wing portions 29, being operative against the flared inner surface of the delivery tube 18 act to prevent any forward axial shifting movement of the auxiliary feed screw 20 while the device is in operation. Also, the feed worm 14 in the direction of its length is spaced from the wall of the housing 10, as indicated at 30 in Fig. 1, whereby the feed worm and auxiliary feed screw are supported by the hollow tube 18.

While I have herein suggested that the auxiliary feed screw 20 might be formed from strip or sheet material of substantially uniform thickness for its length, it will be obvious that the screw may be cast or otherwise formed of metal or it might be produced from a suitable plastic material, such as Bakelite or the like. Also, while I have herein stated that the auxiliary feed screw 20 is to be coupled to the pin 25 by being fitted over a non-round portion thereof, some other form of coupling or detachable joinder for these two elements might be had, such as, for example, the threading of the portion 23 on the shaft 25 and the use of a retaining nut on said shaft to hold the auxiliary screw on the end of the shaft. These and other modifications will be readily apparent to those skilled in this art and are contemplated as within the scope of the claims appended hereto.

What I claim is:

1. The combination with a meat grinder housing provided with an opening and a rotatable feed worm in the housing having a discharge end at the vicinity of the opening, of a device for stuffing sausages and the like comprising an elongated hollow tube, means for detachably mounting an inner end of the tube on the housing and into which material discharges through the opening, the hollow tube from the inner end thereof toward the opposite outer end including an inner relatively wide flared out section and a narrower outer section which is longer than the inner section, an auxiliary feed screw for the hollow tube, means for detachably coupling one end of the feed screw to the discharge end of the feed worm for turning the feed screw in the same direction and at the same speed as the feed worm when the latter is rotated, the feed screw comprising an elongated strip of essentially flat material twisted in the form of a screw, and such strip including radially extending wing portions adapted to engage the inner surface of the relatively wide section of the hollow tube.

2. The combination with a meat grinder housing provided with an opening and a rotatable feed worm in the housing having a discharge end at the vicinity of the opening, of a device for stuffing sausages and the like comprising an elongated hollow tube, means for detachably mounting an inner end of the tube on the housing and into which material discharges through the opening, an auxiliary feed screw for the hollow tube, means for detachably coupling one end of the feed screw to the discharge end of the feed worm for turning the feed screw in the same direction and at the same speed as the feed worm when the latter is rotated, said feed screw comprising an elongated strip of essentially flat material twisted in the form of a screw, the means for detachably coupling the feed screw to the feed worm including a tab portion at one end of the strip which is substantially at a right angle to the longitudinal axis of the feed screw, and the tab portion having an opening adapted to fit over a part at the discharge end of the feed worm to detachably couple the feed worm and feed screw to one another.

3. The combination with a grinder housing provided with an opening and a rotatable feed worm in the housing having a discharge end at the vicinity of the opening, of a device for stuffing sausages and the like comprising an elongated hollow tube, means for detachably mounting an inner end of the tube on the housing and into which material discharges through the opening, the hollow tube from the inner end thereof toward the opposite outer end including an inner relatively wide flared out section and a narrower outer section which is longer than the inner section, an auxiliary feed screw for the hollow tube in which a major portion thereof is disposed within the narrower outer section thereof, means for detachably coupling one end of the feed screw to the discharge end of the feed worm for turning the feed screw in the same direction and at the same speed as the feed worm when the latter is rotated, the feed screw comprising an elongated strip of flat metallic material twisted in the form of a screw, and such strip including diametrically opposed ear portions extending radially outward from a region of the feed screw and adapted to engage the inner surface of the relatively wide section of the hollow tube.

4. The combination with a grinder housing provided with an opening and a rotatable feed worm in the housing having a discharge end at the vicinity of the opening, of a device for stuffing sausages and the like comprising an elongated hollow tube, means for detachably mounting an inner end of the tube on the housing and into which material discharges through the opening, the hollow tube from the inner end thereof toward the opposite outer end including an inner relatively wide flared out section and a narrower outer section which is longer than the inner section, an auxiliary feed screw for the hollow tube in which a major portion thereof is disposed within the narrower outer section thereof, means for detachably coupling one end of the feed screw to the discharge end of the feed worm for turning the feed screw in the same direction and at the same speed as the feed worm when the latter is rotated, the feed screw comprising an elongated strip of essentially flat material twisted in the form of a screw, such feed screw including spaced apart projecting portions forming radially extending ears or tabs adapted to engage the inner surface of the flared out section of the hollow tube, the means for detachably coupling the feed screw to the feed worm including a part at one end of the strip which is transverse to the longitudinal axis of the feed screw and formed with a non-circular aperture, the discharge end of the feed worm having an end portion of the same general shape as the last-mentioned aperture and adapted to receive the apertured end of the feed screw.

LARS JOHAN FAITH ELL.

REFERENCES CITED

The following references are of record in the file of this patent:

UNITED STATES PATENTS

| Number | Name | Date |
|---|---|---|
| 388,940 | Williams, Jr. | Sept. 4, 1888 |
| 478,279 | Gardiner | July 5, 1892 |
| 999,311 | Kather | Aug. 1, 1911 |
| 1,847,690 | Hottmann | Mar. 1, 1932 |
| 1,880,840 | Currier | Oct. 4, 1932 |
| 2,260,302 | Driscoll et al. | Oct. 28, 1941 |
| 2,279,640 | Ringmarck | Apr. 14, 1942 |

FOREIGN PATENTS

| Number | Country | Date |
|---|---|---|
| 447,168 | Great Britain | May 13, 1936 |
| 107,274 | Sweden | Apr. 27, 1943 |